US007642688B2

(12) United States Patent
Nakayama et al.

(10) Patent No.: US 7,642,688 B2
(45) Date of Patent: Jan. 5, 2010

(54) METAL-GRAPHITE BRUSH

(75) Inventors: Shinichi Nakayama, Matsudo (JP); Satoko Shiraki, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 204 days.

(21) Appl. No.: 11/934,953

(22) Filed: Nov. 5, 2007

(65) Prior Publication Data

US 2008/0107860 A1 May 8, 2008

(30) Foreign Application Priority Data

Nov. 8, 2006 (JP) ............................ 2006-302268

(51) Int. Cl.
*H02K 13/00* (2006.01)
*H01R 39/26* (2006.01)
*H01R 39/22* (2006.01)

(52) U.S. Cl. ...................................... 310/251; 428/408

(58) Field of Classification Search ......... 310/231–232, 310/243, 242, 248, 251; 428/408, 497, 500, 428/524, 607–611, 646, 647, 648, 939
See application file for complete search history.

(56) References Cited

U.S. PATENT DOCUMENTS 7,560,847 B2 * 7/2009 Hsu .......................... 310/219
2003/0155837 A1 8/2003 Takahashi et al.
2006/0260436 A1 11/2006 Bachauer et al.

FOREIGN PATENT DOCUMENTS

| | | |
|---|---|---|
| CN | 1439187 | 8/2003 |
| DE | WO 2005/064756 | 7/2006 |
| JP | 07-59299 | 3/1995 |
| JP | 2001-327127 | 11/2001 |
| JP | 2003-272795 | 9/2003 |

* cited by examiner

*Primary Examiner*—Tran N Nguyen
(74) *Attorney, Agent, or Firm*—McGlew and Tuttle, P.C.

(57) ABSTRACT

The metal-graphite brush of the present invention contains graphite, a metal, a lubricant, and bismuth or bismuth oxide in an amount of 1.0 wt. % to 3.0 wt. %. For example, the metal is copper, and the lubricant is molybdenum sulfide.

3 Claims, 7 Drawing Sheets

HIGH-TEMPERATURE AND HIGH-HUMIDITY TEST RESULTS (ALL THE BRUSHES CONTAIN $MoS_2$ IN AN AMOUNT OF 4 wt%)

SPECIFIC RESISTIVITY MEASUREMENT RESULTS

METAL-GRAPHITE BRUSH

BACKGROUND OF THE INVENTION

1. Field of the Invention

The present invention relates to a metal-graphite brush containing graphite, a metal, and a lubricant, which brush is employed in miniature motors.

2. Background Art

Conventionally, metal-graphite brushes (carbon brushes) have been employed in miniature motors (see Japanese Patent Application Laid-Open (kokai) No. H07-59299). FIG. 13A is a vertical cross-sectional view of essential portions of such a common miniature motor; and FIG. 13B is a cross-sectional view of the motor shown in FIG. 13A, as taken along line A-A. As shown in FIGS. 13A and 13B, a permanent magnet is fixed to the inner circumferential surface of a bottomed hollow tubular casing made of a ferromagnetic metallic material. A rotor is formed of an armature facing the permanent magnet and a commutator so that the rotor can be provided in the casing. A casing cap is fitted into the opening of the casing. A carbon brush is provided on a tip end portion of a brush arm made of an electrically conductive material so that the carbon brush is slidably engaged with the commutator. The brush arm and an input terminal electrically connected thereto are provided in the casing cap. The shaft of the rotor is rotatably supported by bearings which are respectively provided in the casing and the casing cap.

A conventional carbon brush (metal-graphite brush) employed in such a miniature motor contains graphite, a metal (generally copper), and a lubricant (generally molybdenum disulfide), and the carbon brush exhibits long service life and excellent stability over time. However, in recent years, further improvement has been required in characteristics in high temperature and humidity environments of a carbon brush employed in, for example, automotive electrical components. In a high-temperature and high-humidity environment, a carbon brush would otherwise be impaired through oxidation, resulting in deterioration of motor characteristics. Therefore, demand has arisen for prevention of impairment through oxidation of a carbon brush for suppressing deterioration of motor characteristics, as well as improvement of the service life of the carbon brush.

Japanese Patent Application Laid-Open (kokai) No. 2001-327127 or 2003-272795 discloses a copper-carbon brush containing bismuth. However, the copper-carbon brush disclosed in Japanese Patent Application Laid-Open (kokai) No. 2001-327127, which contains a small amount of bismuth (about 0.005 to about 0.05 wt. %), was found not to satisfy recent requirements for characteristics in high temperature and humidity environments (see FIG. 3 shown hereinbelow). Meanwhile, Japanese Patent Application Laid-Open (kokai) No. 2003-272795 disclosed only addition of bismuth to a copper-carbon brush, and does not specifically disclose, for example, the bismuth content of the brush.

SUMMARY OF THE INVENTION

In order to solve the aforementioned problems, an object of the present invention is to prevent impairment of a metal-graphite brush due to oxidation of the metal, which brush is employed in the fields requiring further improved characteristics in high temperature and humidity environments, to thereby suppress deterioration of motor characteristics. Another object of the present invention is to prolong the service life of the metal-graphite brush.

The present invention provides a metal-graphite brush comprising graphite, a metal, and a lubricant, which brush further contains bismuth or bismuth oxide in an amount of 1.0 wt. % to 3.0 wt. %. The metal may be copper, and the lubricant may be a metal sulfide.

According to the present invention, since oxidation of the metal (copper) in a high-temperature environment can be suppressed, characteristic deterioration over time (an increase in starting voltage) can be suppressed, and specific resistivity can be reduced, whereby reduction in service life can be prevented. Furthermore, brush wear and commutator wear can be reduced to a sufficiently low level.

In addition, the metal-graphite brush (carbon brush) of the present invention can be produced by adding an appropriate amount of bismuth (Bi) or bismuth oxide ($Bi_2O_3$) to raw materials (e.g., a metal (copper) and graphite) during a production step thereof, and no great change is provided to the production steps (other than the incorporation step) of the carbon brush, nor is any great change is provided to the profile or characteristics of the carbon brush. Therefore, the carbon brush can be applied as is to a conventionally employed motor without modifying the configuration of the motor.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF THE PREFERRED EMBODIMENTS

Since the metal-graphite brush (carbon brush) of the present invention contains bismuth (Bi) or bismuth oxide ($Bi_2O_3$) in an amount of 1.0 wt. % to 3.0 wt. %, oxidation of metal (copper) contained in the carbon brush is considerably suppressed. Therefore, as compared with conventional cases, motor characteristics can be remarkably improved; i.e., an increase in starting voltage can be suppressed. In addition, there is no reduction in service life due to brush wear or commutator wear. The metal-graphite brush (carbon brush) contains, in addition to bismuth (Bi) or bismuth oxide ($Bi_2O_3$), a metal (generally copper powder: 20 to 80 wt. %), a lubricant (generally molybdenum disulfide: 1 to 6 wt. %), and graphite (balance). The metal may be copper alone, or a mixture of copper (primary component) such as a copper alloy (e.g., phosphor bronze) or copper with another metal (e.g., silver). The lubricant may be a metal sulfide; for example, molybdenum disulfide ($MoS_2$) or tungsten disulfide ($WS_2$).

Figure 1:
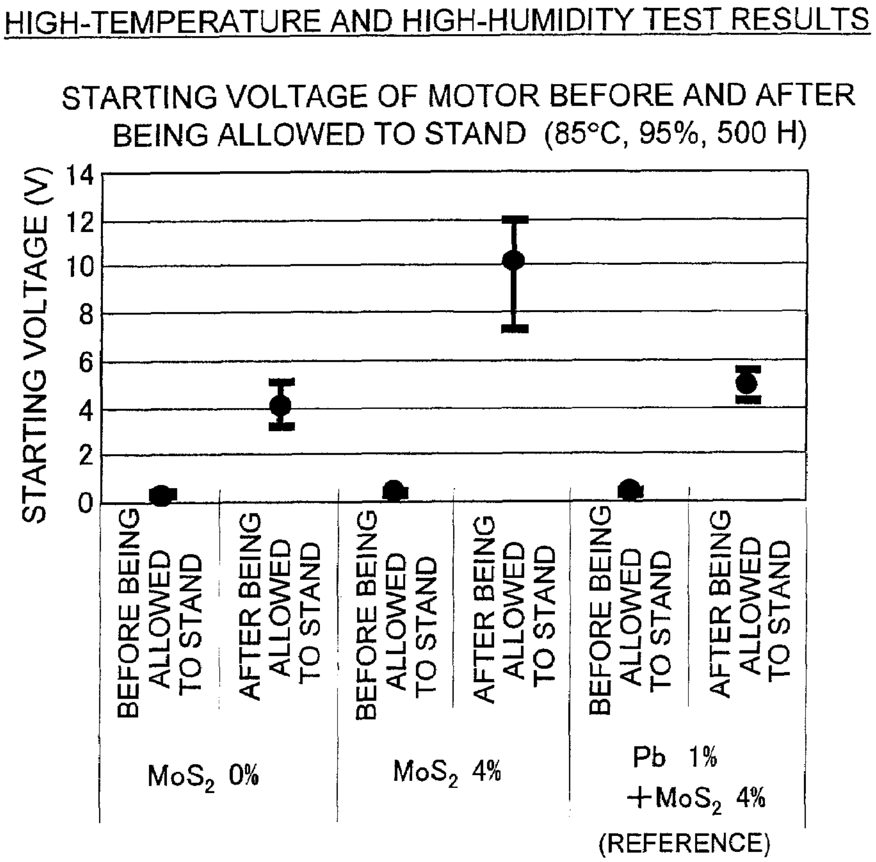
FIG. 1 is a graph showing the results of a high-temperature and high-humidity test.

FIG. 1 is a graph showing the results of a high-temperature and high-humidity test. The graph shows data of starting voltage of motors, as measured before and after the motors are allowed to stand for 500 hours (H) in a high-temperature and high-humidity environment (temperature: 85° C., humidity: 95%). Specifically, FIG. 1 shows comparison of data of starting voltage of motors in the cases of no addition of molybdenum disulfide ($MOS_2$ 0%), addition of molybdenum disulfide in an amount of 4% ($MOS_2$ 4%), and addition of lead in an amount of 1% (Pb 1%+$MOS_2$ 4%) (reference), the data being measured before and after the motors are allowed to stand in the high-temperature and high-humidity environment. Each of the data range bars shown herein corresponds to the range of data obtained from at least five test samples, wherein the top and bottom of the bar correspond to the maximum and minimum of the data range, respectively, and a point between the maximum and the minimum represents the average value.

Figure 2:
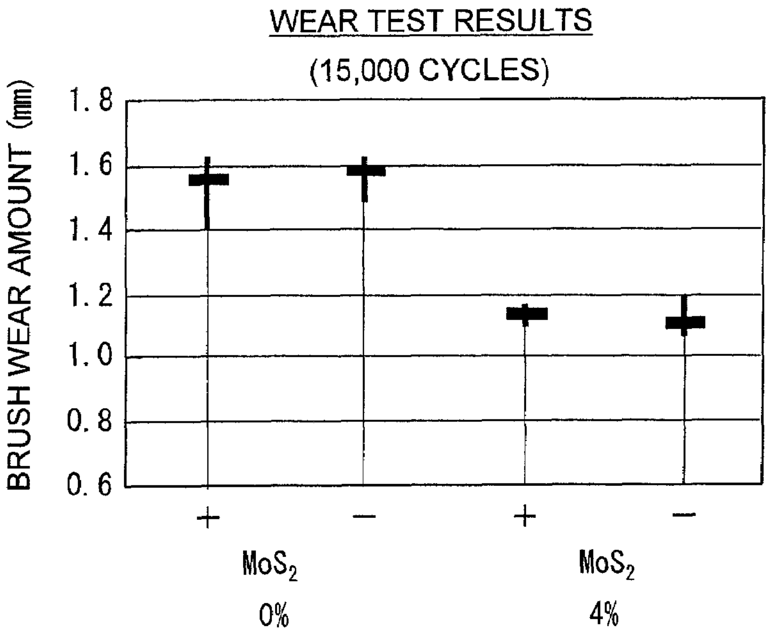
FIG. 2 is a graph showing the results of a wear test.

When a carbon brush of a motor contains molybdenum disulfide, the starting voltage of the motor after being allowed to stand in a high-temperature and high-humidity environment increases as compared with that of the motor before being allowed to stand in the environment, and performance of the motor is impaired. However, as shown in FIG. 2 described below, molybdenum disulfide exhibits the effect of considerably reducing carbon brush wear, thereby improving service life, and therefore molybdenum disulfide must be added to a carbon brush. Tungsten disulfide exhibits the same effect as molybdenum disulfide. Although an increase in starting voltage can be suppressed through addition of lead, lead, which is an environmental load substance, cannot be used currently. The lower the starting voltage of a motor, the more preferred the motor is. As is clear from the test data shown in FIG. 1, a motor can be started at about 0.5 (V) before being allowed to stand in a high-temperature and high-humidity environment.

FIG. 2 is a graph showing the results of a wear test. A motor connected to a load (fan) was operated in an ambient-temperature and ambient-humidity environment for 15,000 cycles, each cycle consisting of the steps of forward rotation (three seconds), power-off (five seconds), reverse rotation (three seconds), and power-off (five seconds), followed by measurement of the amount of brush wear. The symbols "+" and "−" shown in FIG. 2 respectively correspond to brushes on the sides of positive and negative terminals of a power supply. As is clear from FIG. 2, carbon brush wear is considerably reduced through addition of molybdenum disulfide ($MOS_2$ 4%).

Figure 3:
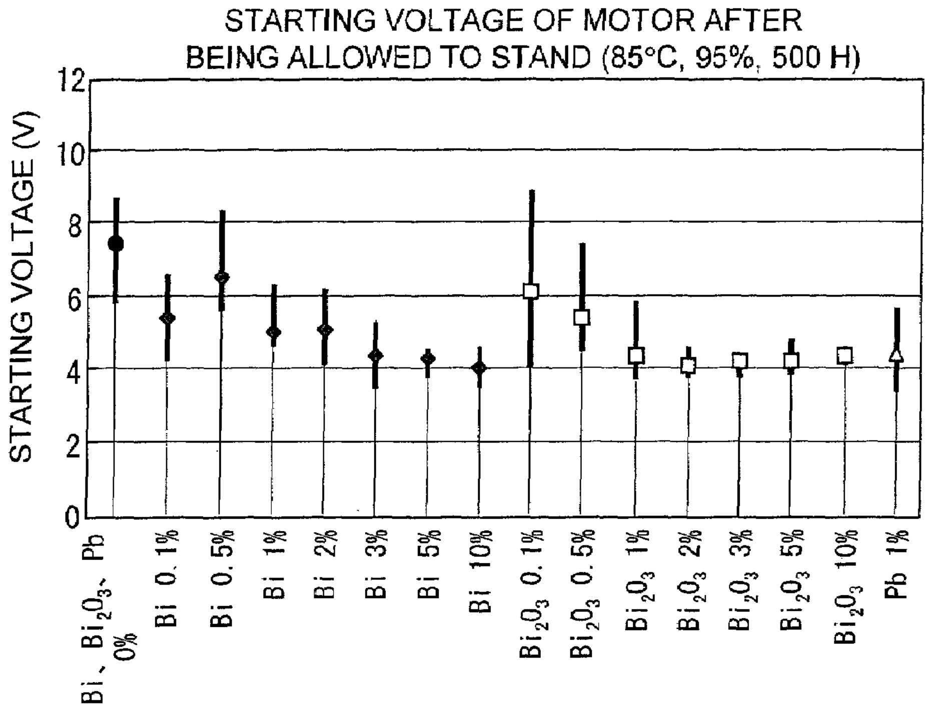
FIG. 3 is a graph showing the results of a high-temperature and high-humidity test performed on motors employing a brush containing bismuth (Bi) or bismuth oxide ($Bi_2O_3$)

FIG. 3 is a graph showing the results of a high-temperature and high-humidity test performed on motors employing a brush containing molybdenum disulfide (4 wt. %) and bismuth (Bi) or bismuth oxide ($Bi_2O_3$). In the graph of FIG. 3, the horizontal axis corresponds to the amount (wt. %) of added bismuth (Bi), bismuth oxide ($Bi_2O_3$), or lead (Pb) (reference); and the vertical axis corresponds to starting voltage. Similar to the case of FIG. 1, FIG. 3 shows data of starting voltage of motors, as measured after the motors have been allowed to stand for 500 hours (H) in a high-temperature and high-humidity environment (temperature: 85° C., humidity: 95%).

In FIG. 3, the data range bar on the extreme left side corresponds to data of starting voltage in the case of no addition (0 wt. %) of bismuth (Bi), bismuth oxide ($Bi_2O_3$), or lead (Pb); the data range bars on the right side thereof correspond to data of stating voltage in the cases of addition of bismuth (Bi) in an amount of 0.1 to 10 wt. %, and bismuth oxide ($Bi_2O_3$) in an amount of 0.1 to 10 wt. %; and the data range bar on the extreme right side corresponds to data of starting voltage in the case of addition of lead (Pb) in an amount of 1.0 wt. %. As is clear from FIG. 3, addition of bismuth (Bi) or bismuth oxide ($Bi_2O_3$) in an amount of 1.0 wt. % or more suppresses deterioration of characteristics (i.e., an increase in starting voltage) of a motor after being allowed to stand for 500 hours (H) in the high-temperature and high-humidity environment. When the amount of bismuth or bismuth oxide added is 1.0 wt. % or more, the highest starting voltage is suppressed to about 6 V, and, as compared with the case where the addition amount is less than 1%, the range of starting voltage (i.e., the range between the lowest starting voltage and the highest starting voltage) is reduced. Therefore, addition of bismuth or bismuth oxide in an amount of 1.0 wt. % or more is suitable for mass-production of motors with consistent performance. As described above, in each of the data range bars shown in the graph, the top and bottom of the bar correspond to the maximum and minimum of the data range, respectively, and a point between the maximum and the minimum represents the average value. The state of each brush after the 500-hour test was observed in a micrograph. In brushes containing neither bismuth (Bi) nor bismuth oxide ($Bi_2O_3$), copper was found to be considerably impaired through oxidation over time, whereas in brushes containing bismuth or bismuth oxide, such considerable impairment was not found.

As is clear from FIG. 3, when bismuth (Bi) or bismuth oxide ($Bi_2O_3$) is added only in an amount of about 0 to about 0.5 wt. %, the highest starting voltage of a motor greatly exceeds 6 V; i.e., no improvement is observed in starting voltage after the motor has been allowed to stand in the high-temperature and high-humidity environment. In addition, the range of starting voltage (i.e., the range between the lowest starting voltage and the highest starting voltage) is increased. Therefore, addition of such a small amount of bismuth or bismuth oxide is not suitable for production of motors with consistent performance. That is, addition of bismuth in an amount of about 0.005 to about 0.05 wt. %, which is disclosed in Japanese Patent Application Laid-Open (kokai) No. 2001-327127, fails to satisfy recent requirements for characteristics in high temperature and humidity environments.

Figure 4:
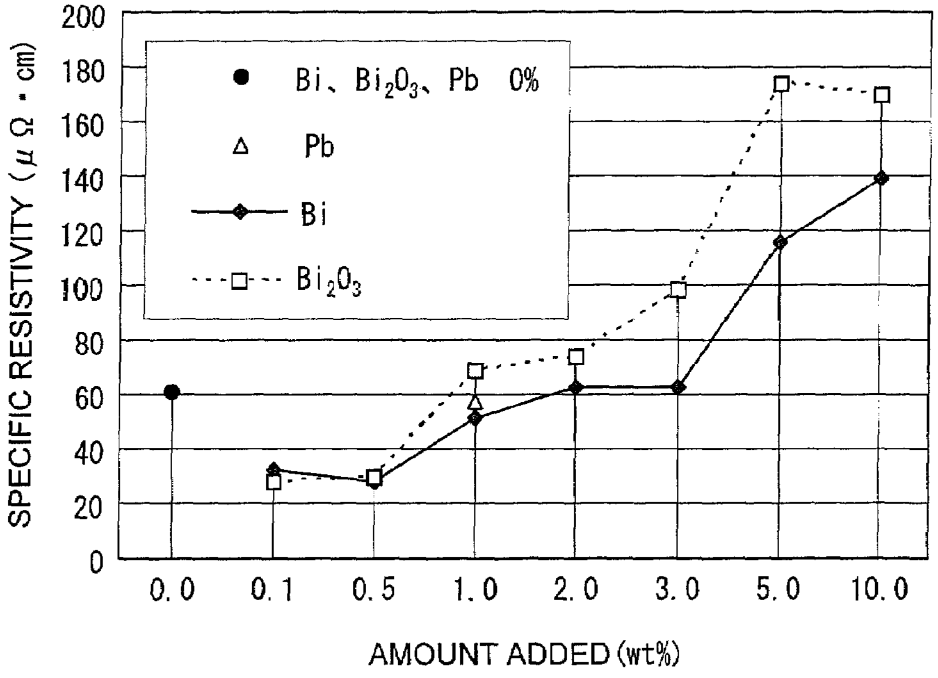
FIG. 4 is a graph showing the results of measurement of specific resistivity of brushes containing bismuth (Bi) or bismuth oxide ($Bi_2O_3$)

FIG. 4 is a graph showing the results of measurement of specific resistivity of brushes containing molybdenum disulfide (4 wt. %) and bismuth (Bi) or bismuth oxide ($Bi_2O_3$) In FIG. 4, the symbol "black square" represents specific resistivity in the case where the amount of bismuth (Bi) added is 0.1 to 10 wt. %; the symbol "white square" represents specific resistivity in the case where the amount of bismuth oxide ($Bi_2O_3$) added is 0.1 to 10 wt. %; the symbol "white triangle" represents specific resistivity in the case where the amount of lead (Pb) added is 1.0 wt. %; and the symbol "black circle" on the extreme left side of the graph represents specific resistivity in the case of no addition (0 wt. %) of bismuth (Bi), bismuth oxide ($Bi_2O_3$), or lead (Pb). As is clear from FIG. 4, when the amount of bismuth or bismuth oxide added exceeds 3.0 wt. %, specific resistivity increases drastically. When specific resistivity is high, heat generation in a brush causes an increase in electric current loss during operation of a motor. In contrast, when the amount of bismuth or bismuth oxide added is controlled to 3% or less, specific resistivity is reduced, and an increase in heat generation is prevented during operation of a motor.

As shown in FIG. 3, when the amount of bismuth or bismuth oxide added is 1% or more, the highest starting voltage, and the range of starting voltage is reduced. Meanwhile, as shown in FIG. 4, when the amount of bismuth or bismuth oxide added is 3% or less, specific resistivity is reduced, and heat generation during operation of a motor is suppressed.

Thus, setting the amount of bismuth or bismuth oxide added to 1.0 wt. % to 3.0 wt. % improves starting voltage of a motor after being allowed to stand in a high-temperature and high-humidity environment, as well as specific resistivity of a brush. Furthermore, addition of bismuth or bismuth oxide in such an amount provides sufficiently good results in terms of brush wear and commutator wear, which will next be described with reference to FIGS. 5 to 12.

Figure 5:
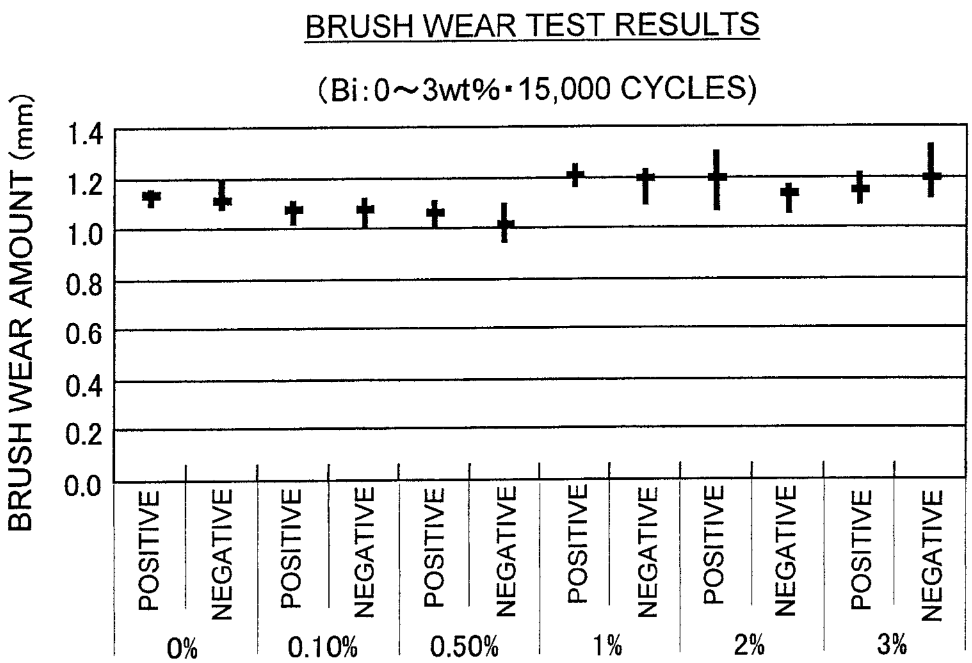
FIG. 5 is a graph showing the amount of wear of brushes containing bismuth (Bi) in an amount of 0 wt. % to 3 wt. %.
Figure 6:
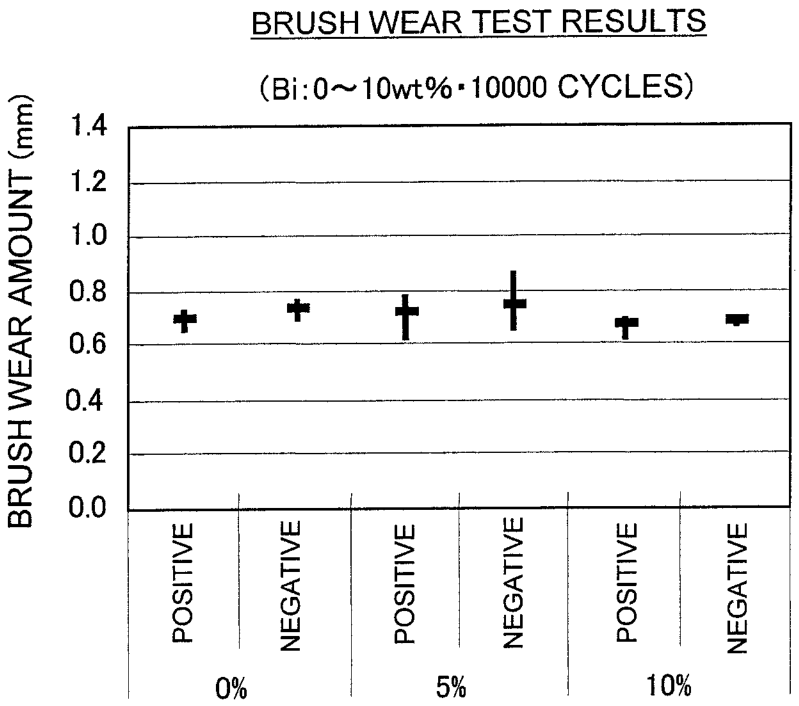
FIG. 6 is a graph showing the amount of wear of brushes containing bismuth (Bi) in an amount of 0 wt. % to 10 wt. %.

FIGS. 5 and 6 are graphs showing the results of brush wear tests performed under conditions similar to those in the aforementioned wear test whose results are shown above in FIG. 2. A motor connected to a load (fan) was operated in an ambient-temperature and ambient-humidity environment for 15,000 cycles (FIG. 5) or 10,000 cycles (FIG. 6), each cycle consisting of the steps of forward rotation (three seconds), power-off (five seconds), reverse rotation (three seconds), and power-off (five seconds), followed by measurement of the amount of brush wear. FIG. 5 shows the amount of wear of brushes containing bismuth (Bi) in an amount of 0 wt. % to 3 wt. %; and FIG. 6 shows the amount of wear of brushes containing bismuth (Bi) in an amount of 0 wt. % to 10 wt. %. As is clear from these data, even when bismuth (Bi) is added in an amount of 1 wt. % to 3 wt. % (FIG. 5), there are no adverse effects on brush wear.

Figure 7:
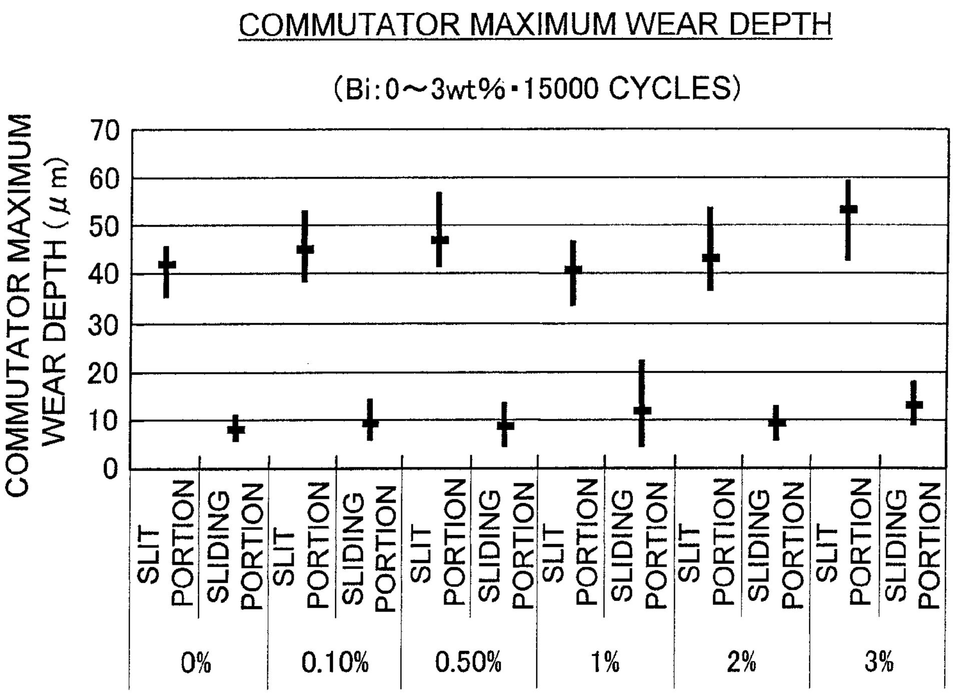
FIG. 7 is a graph showing the maximum wear depth of commutators containing bismuth (Bi) in an amount of 0 wt. % to 3 wt. %.
Figure 8:
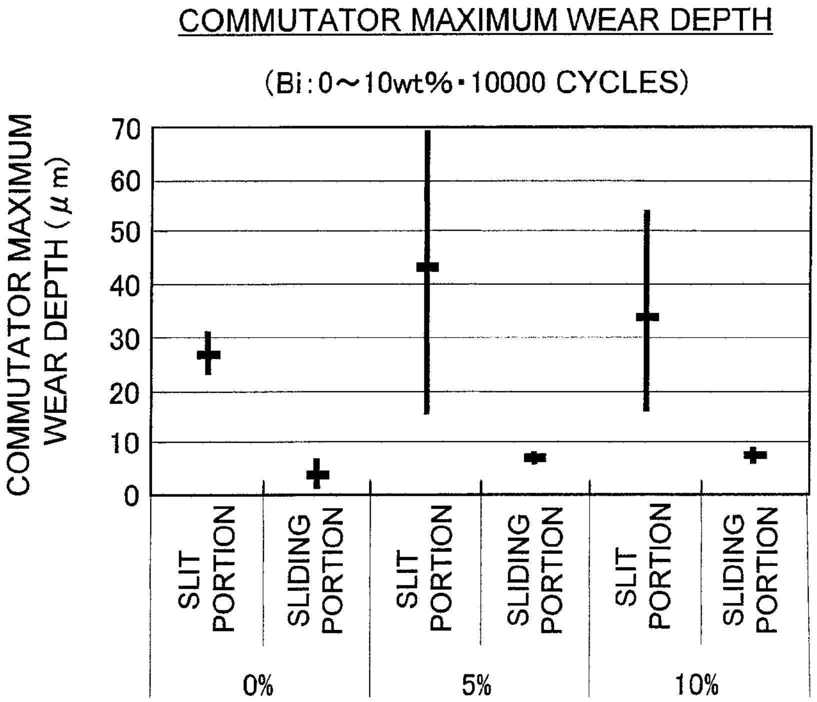
FIG. 8 is a graph showing the maximum wear depth of commutators containing bismuth (Bi) in an amount of 0 wt. % to 10 wt. %.
Figure 9:
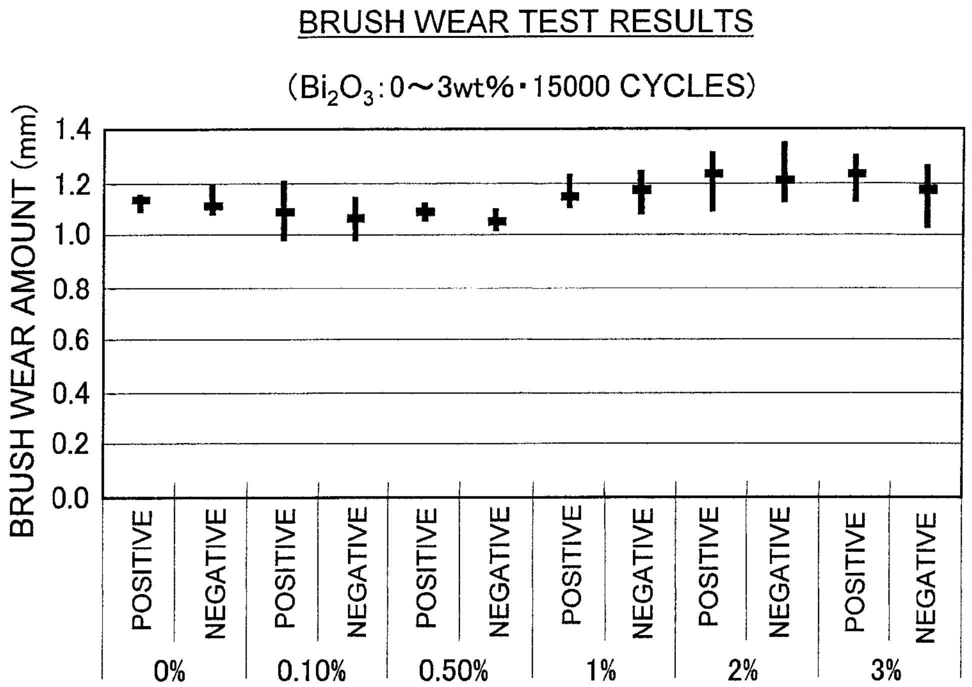
FIG. 9 is a graph showing the amount of wear of brushes containing bismuth oxide ($Bi_2O_3$) in an amount of 0 wt. % to 3 wt. %.
Figure 10:
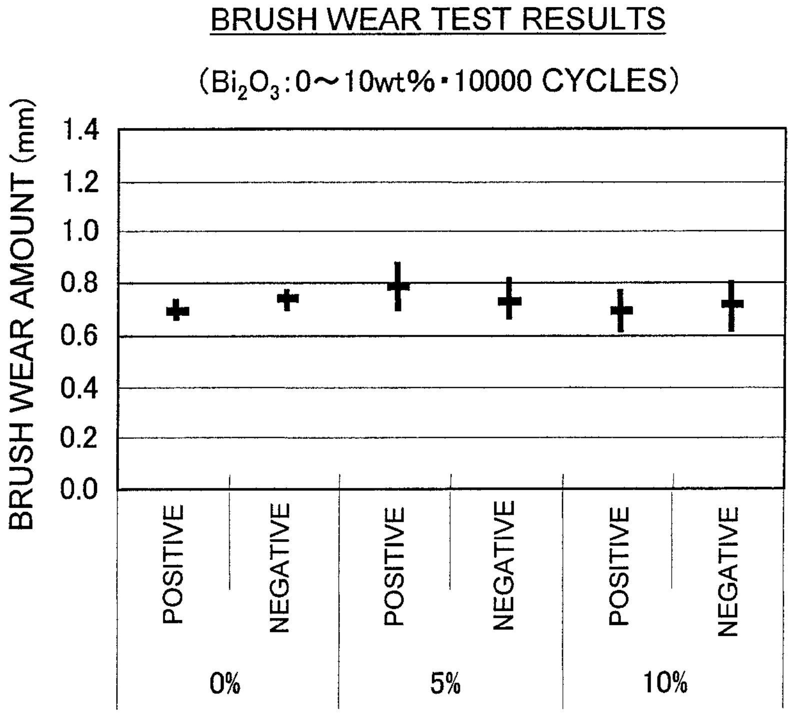
FIG. 10 is a graph showing the amount of wear of brushes containing bismuth oxide ($Bi_2O_3$) in an amount of 0 wt. % to 10 wt. %.

FIGS. 7 and 8 are graphs showing the results of commutator wear tests performed under conditions similar to those as described above. FIG. 7 shows the maximum wear depth of commutators containing bismuth (Bi) in an amount of 0 wt. % to 3 wt. %; and FIG. 8 shows the maximum wear depth of commutators containing bismuth (Bi) in an amount of 0 wt. % to 10 wt. %. Addition of bismuth (Bi) in an amount of 1 wt. % to 3 wt. % causes no adverse effects (FIG. 7), but addition of bismuth in an amount of 5 to 10 wt. % causes an increase in wear of a slit portion.

Figure 11:
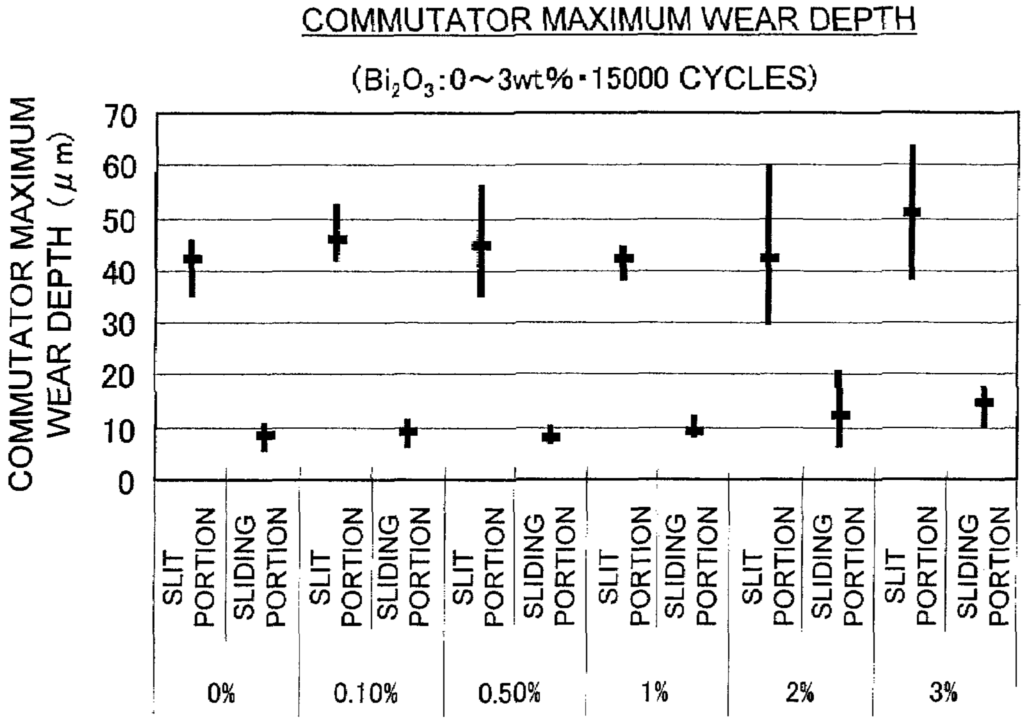
FIG. 11 is a graph showing the maximum wear depth of commutators containing bismuth oxide ($Bi_2O_3$) in an amount of 0 wt. % to 3 wt. %.
Figure 12:
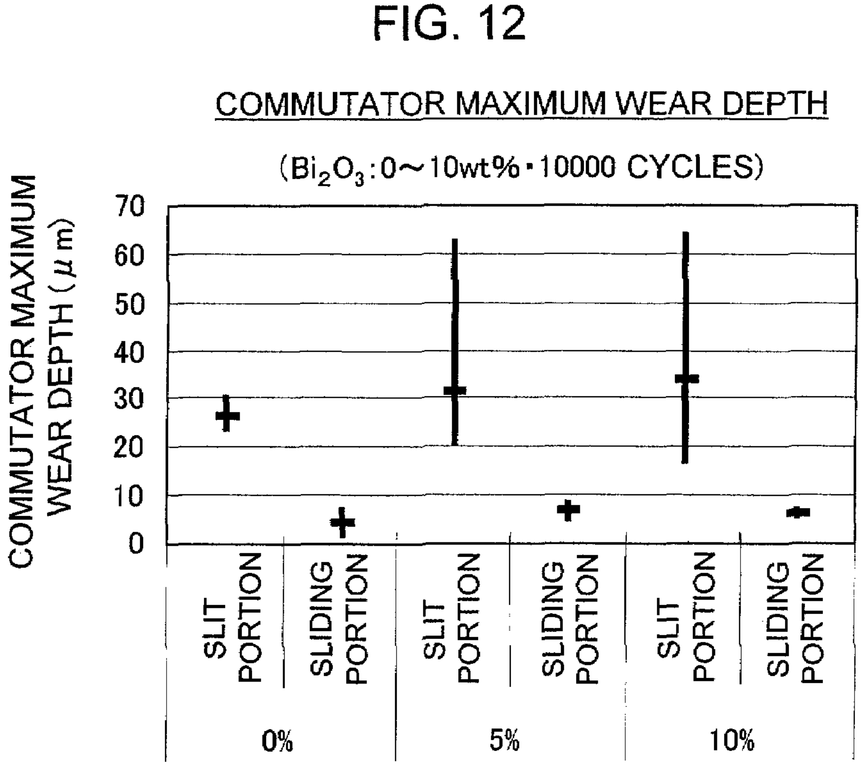
FIG. 12 is a graph showing the maximum wear depth of commutators containing bismuth oxide ($Bi_2O_3$) in an amount of 0 wt. % to 10 wt. %.
Figure 13A:
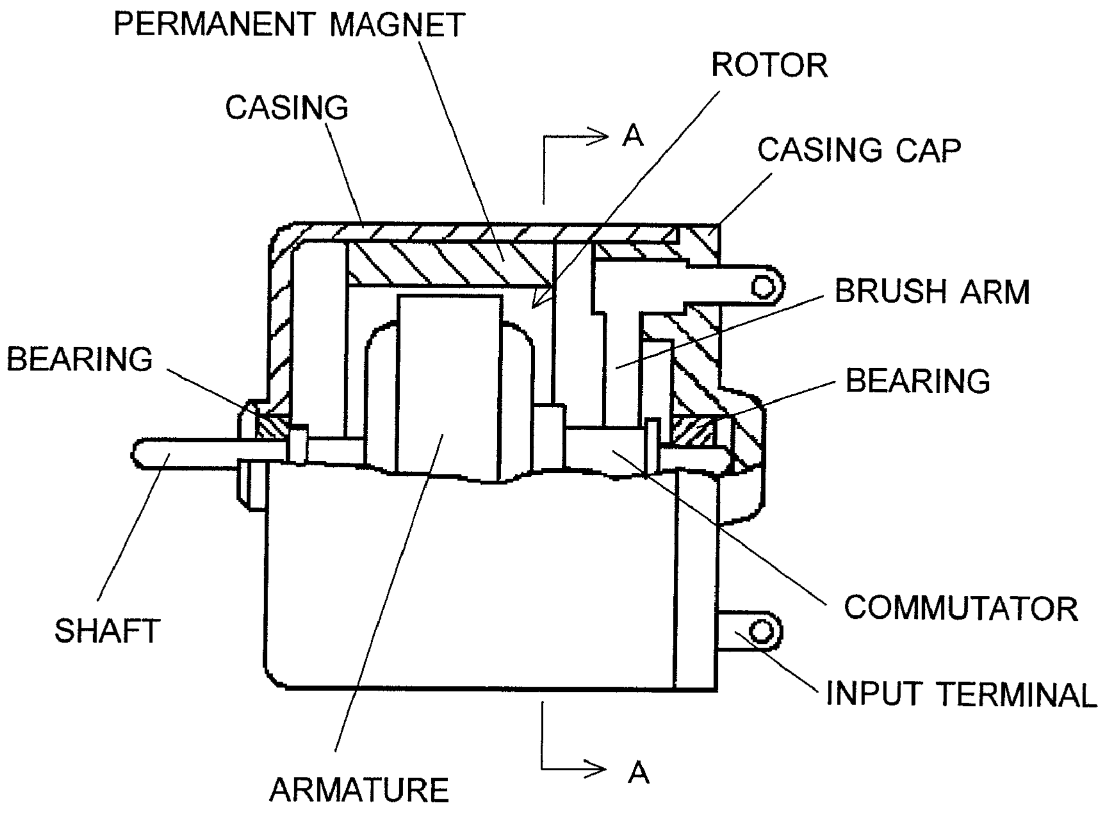
FIG. 13A is a vertical cross-sectional view of essential portions of a common miniature motor.
Figure 13B:
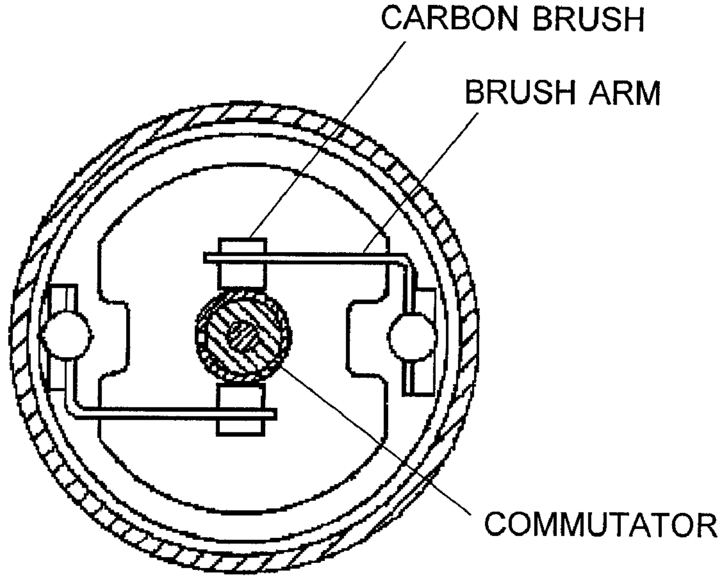
FIG. 13B is a cross-sectional view of the motor shown in FIG. 13A, as taken along line A-A.

FIGS. 9 to 12 are graphs showing the results of wear tests on brushes and commutators containing bismuth oxide ($Bi_2O_3$), the tests being performed in a manner similar to that of the aforementioned wear tests (addition of Bi) whose results are shown in FIGS. 5 to 8. As is clear from FIGS. 9 and 10, even when bismuth oxide ($Bi_2O_3$) is added in an amount of 1 wt. % to 3 wt. %, there are no adverse effects on brush wear. As shown in FIGS. 11 and 12, when bismuth oxide ($Bi_2O_3$) is added in an amount of 1 wt. % to 3 wt. %, there are no adverse effects on commutator wear, whereas when bismuth oxide is added in an amount of 5 to 10 wt. %, wear of a slit portion increases.

What is claimed is:

1. A metal-graphite brush comprising graphite, a metal, and a lubricant, which brush further contains bismuth or bismuth oxide in an amount of 1.0 wt. % to 3.0 wt. %.

2. A metal-graphite brush as described in claim 1, wherein the metal is copper.

3. A metal-graphite brush as described in claim 1, wherein the lubricant is a metal sulfide.

* * * * *